US010419984B2

United States Patent
Hrabak et al.

(10) Patent No.: US 10,419,984 B2
(45) Date of Patent: Sep. 17, 2019

(54) WIRELESS DEVICE CONNECTION MANAGEMENT

(71) Applicant: GM GLOBAL TECHNOLOGY OPERATIONS LLC, Detroit, MI (US)

(72) Inventors: Robert A. Hrabak, Birmingham, MI (US); John Sergakis, Bloomfield Hills, MI (US); Nikhil N. Neti, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 51 days.

(21) Appl. No.: 15/627,140

(22) Filed: Jun. 19, 2017

(65) Prior Publication Data

US 2018/0368030 A1 Dec. 20, 2018

(51) Int. Cl.
*H04W 36/00* (2009.01)
*H04W 48/18* (2009.01)
*H04W 88/06* (2009.01)
*H04W 36/02* (2009.01)

(52) U.S. Cl.
CPC ... *H04W 36/0055* (2013.01); *H04W 36/0005* (2013.01); *H04W 48/18* (2013.01); *H04W 36/02* (2013.01); *H04W 36/03* (2018.08); *H04W 88/06* (2013.01)

(58) Field of Classification Search
CPC ....... H04W 4/80; H04W 48/18; H04W 84/12; H04W 8/205; H04W 92/18
See application file for complete search history.

(56) References Cited

U.S. PATENT DOCUMENTS

| 2013/0023258 A1* | 1/2013 | Choi | H04M 1/7253 455/418 |
| 2016/0295487 A1* | 10/2016 | Pandit | H04W 48/18 |
| 2018/0326994 A1* | 11/2018 | Sakai | B60W 50/082 |

OTHER PUBLICATIONS

"Bluetooth® Secure Simple Pairing Using NFC", NFC Forum, Jan. 9, 2014, 39 pages.

* cited by examiner

*Primary Examiner* — Raj Jain
(74) *Attorney, Agent, or Firm* — Reising Ethington P.C.; David Willoughby (57) ABSTRACT

A system and method of managing short-range wireless communication connections at a vehicle, the method including: receiving a wireless signal from a personal mobile device at the vehicle, wherein the wireless signal is received using a first short-range wireless communication (SRWC) technology; determining whether to perform a connection handover based on the received wireless signal; when it is determined that the connection handover is to be performed, then carrying out the connection handover that includes establishing an alternative carrier connection between a wireless communications device and the personal mobile device using a second SRWC technology, wherein the wireless communications device is installed in the vehicle; and when it is determined that the connection handover is not to be performed, then setting the wireless communications device to operate in a discovery mode, wherein the discovery mode includes sending an inquiry message indicating availability of a connection to the wireless communications device.

13 Claims, 2 Drawing Sheets

WIRELESS DEVICE CONNECTION MANAGEMENT

INTRODUCTION

The disclosure relates to modifying device priority of a plurality of short-range wireless communications devices.

Many electronic devices now carry out network communications. For example, many electronic devices can transmit voice and data communications over both a short-range wireless network, such as Wi-Fi™, and/or a cellular network, such as GPRS or CDMA. Some vehicles are able to connect to mobile devices or other short-range wireless communication (SRWC) devices using one or more SRWC technologies. Additionally, some SRWC devices support connection handovers using near field communications (NFC). Such connection handovers may facilitate establishment of other SRWC connections using NFC; however, some devices support NFC connections but do not support connection handovers using NFC.

SUMMARY

According to a first embodiment, there is provided a method of managing short-range wireless communication connections at a vehicle, the method including: receiving a wireless signal from a personal mobile device at the vehicle, wherein the wireless signal is received using a first short-range wireless communication (SRWC) technology; determining whether to perform a connection handover based on the received wireless signal; when it is determined that the connection handover is to be performed, then carrying out the connection handover that includes establishing an alternative carrier connection between a wireless communications device and the personal mobile device using a second SRWC technology, wherein the wireless communications device is installed in the vehicle; and when it is determined that the connection handover is not to be performed, then setting the wireless communications device to operate in a discovery mode, wherein the discovery mode includes sending an inquiry message indicating availability of a connection to the wireless communications device.

According to other embodiments, there is provided that of the first embodiment further including any one or more of the following:

wherein the first SRWC technology is a near field communication (NFC) technology;

wherein the determination of whether to perform the connection handover is based on a determination of whether the personal mobile device supports connection handovers using NFC;

wherein the second SRWC technology is one of the following: Wi-Fi™ WiMAX™, ZigBee™, Wi-Fi direct™, Bluetooth™, or Bluetooth Low Energy™ (BLE);

wherein the wireless signal is a wireless near field communication (NFC) signal that is in NFC Data Exchange Format (NDEF);

wherein the wireless signal is received at a NFC module installed in the vehicle;

wherein the NFC module is connected to the wireless communications device, and wherein the NFC module sends information included in or associated with the received wireless signal;

wherein the connection handover further comprises sending a response message to the personal mobile device from the NFC module;

further comprising the step of establishing a SRWC connection using the second SRWC protocol after setting the wireless communications device to the discovery mode;

wherein the first SRWC technology is a near field communication (NFC) technology and the second SRWC technology is a Bluetooth™ or Wi-Fi™ technology;

wherein the wireless message includes Bluetooth™ Out-of-Band (OOB) data; and/or wherein the wireless communications device comprises a first SRWC chipset that is used to carry out wireless communications via the first SRWC technology and wherein the wireless communications device comprises a second SRWC chipset that is used to carry out wireless communications via the second SRWC technology.

According to a second embodiment, there is provided a method of managing short-range wireless communication connections at a vehicle, the method including: receiving a wireless NFC message from a personal mobile device via near field communication (NFC) technology at a NFC module installed in the vehicle, wherein the wireless NFC message is in NFC Data Exchange Format (NDEF), and wherein the personal mobile device includes an NFC chipset; determining whether to perform a connection handover based on the received wireless NFC signal; when it is determined that the connection handover is to be performed, then automatically carrying out the connection handover, wherein the connection handover includes: sending a NFC response message to the personal mobile device using the NFC module installed in the vehicle in response to the wireless NFC message received from the personal mobile device, wherein the NFC response message is in NFC Data Exchange Format (NDEF), and wherein the NFC response message indicates at least one short-range wireless communication (SRWC) technology other than NFC that the vehicle is configured to carry out; subsequently, establishing an alternative carrier connection between a wireless communications device and the personal mobile device using a second SRWC technology, wherein the wireless communications device is included in the vehicle, and wherein the second SRWC technology is one of the at least one SRWC technologies indicated in the NFC response message; and after the alternative carrier connection is established between the wireless communications device and the personal mobile device using a second SRWC technology, then carrying out SRWC communications using the established alternative carrier connection; and when it is determined that the connection handover should is not to be performed, then setting the wireless communications device to operate in a discovery mode using one or more SRWC technologies including Bluetooth™, wherein the discovery mode includes sending an inquiry message indicating availability of a connection to the wireless communications device.

According to a third embodiment, there is provided a vehicle communications system, including: a near field communications (NFC) module that includes a NFC chipset and an antenna; a wireless communications device, including: a short-range wireless communications (SRWC) chipset; a memory device; a processor; wherein the vehicle communications system is configured to: receive a NFC signal from a personal mobile device at the NFC module, wherein the NFC signal is in NFC Data Exchange Format (NDEF); determine whether to perform a connection handover based on the received wireless signal; when it is determined that the connection handover is to be performed, then carry out the connection handover that includes establishing an alternative carrier connection between a wireless communications device and the personal mobile device using a second SRWC technology, wherein the wireless communications device is installed in the vehicle; and when it is determined that the connection handover is not to be performed, then set the wireless communications device to operate in a discovery mode, wherein the discovery mode includes sending an inquiry message indicating availability of a connection to the wireless communications device.

According to other embodiments, there is provided that of the third embodiment further including any one or more of the following:
wherein the vehicle communications system is configured to perform the determining step using the processor of the wireless communications device; and/or
wherein the vehicle communications system is further configured to send information included in or associated with the NFC signal from the NFC module to the wireless communications device and, wherein the determination of whether to perform the connection handover is based on the information sent from the NFC module.

BRIEF DESCRIPTION OF THE DRAWINGS

Exemplary embodiments will hereinafter be described in conjunction with the appended drawings, wherein like designations denote like elements, and wherein.

DETAILED DESCRIPTION

The system and methods below enable a vehicle to manage short-range wireless communications (SRWC) including automatically setting a wireless communications device included in a vehicle to a discovery mode when a connection handover using near field communications (NFC) is not to be performed. In one embodiment, the vehicle may receive wireless signal or message from a personal mobile device, such as a smartphone. The vehicle may then determine, based on the signal or message, whether a connection handover (e.g., using NFC to at least partly establish or expedite a connection using another SRWC, as will be explained more below) should or is to be performed. For example, the personal mobile device may not be configured to operate in a manner enabling a connection handover using NFC (or other SRWC technology) and, thus, it may be determined that a connection handover is not to be performed. Or, the personal mobile device may be configured to operate in a manner that does enable the connection handover and, thus, a connection handover is performed. In the scenario where it is determined that the connection handover is not to be performed, the wireless communications device included in the vehicle can be set to operate in a discovery mode thereby providing, at least in some embodiments, an expedited and/or at least partly automated SRWC connection establishment or pairing mechanism between the mobile device and the wireless communications device.

Figure 1:
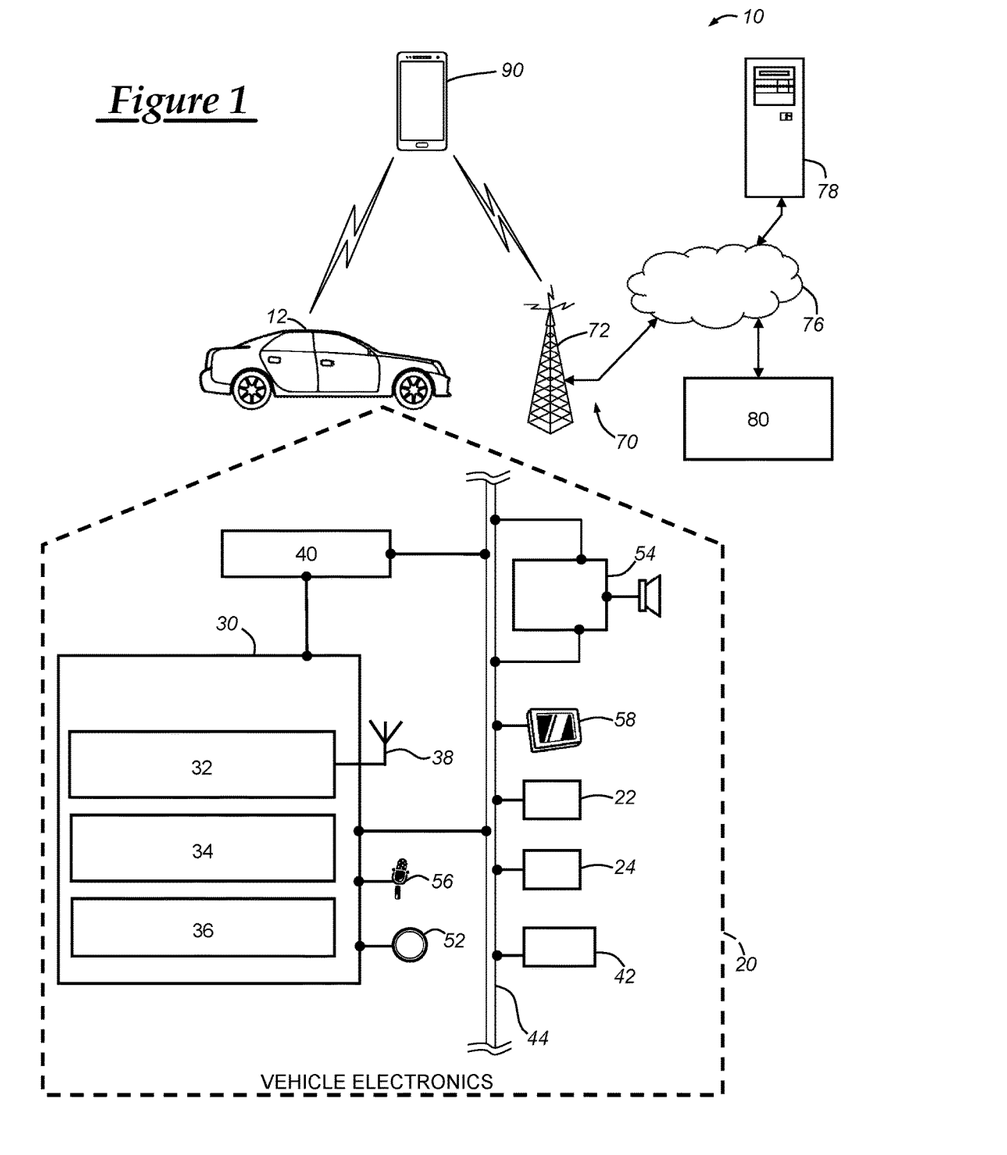
FIG. 1 is a block diagram depicting an embodiment of a communications system that is capable of utilizing the method disclosed herein.

Referring now to FIG. 1, there is shown an operating environment that comprises a communications system 10 and that can be used to implement the method disclosed herein. Communications system 10 generally includes a vehicle 12 with a wireless communications device 30, an NFC module 40, one or more wireless carrier systems 70, a land communications network 76, a computer 78, a remote facility 80, and a personal mobile device 90. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Wireless carrier system 70 may be any suitable cellular telephone system. Carrier system 70 is shown as including a cellular tower 72; however, the carrier system 70 may include one or more of the following components (e.g., depending on the cellular technology): cellular towers, base transceiver stations, mobile switching centers, base station controllers, evolved nodes (e.g., eNodeBs), mobility management entities (MMEs), serving and PGN gateways, etc., as well as any other networking components required to connect wireless carrier system 70 with the land network 76 or to connect the wireless carrier system with user equipment (UEs, e.g., which include telematics equipment in vehicle 12). Carrier system 70 can implement any suitable communications technology, including for example GSM/GPRS technology, CDMA or CDMA2000 technology, LTE technology, etc. In general, wireless carrier systems 70, their components, the arrangement of their components, the interaction between the components, etc. is generally known in the art.

Apart from using wireless carrier system 70, a different wireless carrier system in the form of satellite communication can be used to provide uni-directional or bi-directional communication with the vehicle. This can be done using one or more communication satellites (not shown) and an uplink transmitting station (not shown). Uni-directional communication can be, for example, satellite radio services, wherein programming content (news, music, etc.) is received by the uplink transmitting station, packaged for upload, and then sent to the satellite, which broadcasts the programming to subscribers. Bi-directional communication can be, for example, satellite telephony services using the one or more communication satellites to relay telephone communications between the vehicle 12 and the uplink transmitting station. If used, this satellite telephony can be utilized either in addition to or in lieu of wireless carrier system 70.

Land network 76 may be a conventional land-based telecommunications network that is connected to one or more landline telephones and connects wireless carrier system 70 to remote facility 80. For example, land network 76 may include a public switched telephone network (PSTN) such as that used to provide hardwired telephony, packet-switched data communications, and the Internet infrastructure. One or more segments of land network 76 could be implemented through the use of a standard wired network, a fiber or other optical network, a cable network, power lines, other wireless networks such as wireless local area networks (WLANs), or networks providing broadband wireless access (BWA), or any combination thereof.

Computers 78 (only one shown) can be some of a number of computers accessible via a private or public network such as the Internet. Each such computer 78 can be used for one or more purposes, such as a web server accessible by vehicle 12. Other such accessible computers 78 can be, for example: a service center computer where diagnostic information and other vehicle data can be uploaded from the vehicle; a client computer used by the vehicle owner or other subscriber for such purposes as accessing or receiving vehicle data or to setting up or configuring subscriber preferences or controlling vehicle functions; a car sharing server which coordinates registrations from a plurality of users who request to use a vehicle as part of a car sharing service; or a third party repository to or from which vehicle data or other information is provided, whether by communicating with the vehicle 12, remote facility 80, or both. A computer 78 can also be used for providing Internet connectivity such as DNS services or as a network address server that uses DHCP or other suitable protocol to assign an IP address to the vehicle 12.

Remote facility 80 may be designed to provide the vehicle electronics 20 and mobile device 90 with a number of different system back-end functions. For example, remote facility 80 may be used in part to implement a car sharing service. In such a case, remote facility 80 may coordinate registrations of vehicles, store data pertaining to the registrations or other aspects of the car sharing service, and/or provide authentication and authorization data to SRWC devices (e.g., personal mobile device 90), users, and/or vehicles. The remote facility 80 may include one or more switches, servers, databases, live advisors, as well as an automated voice response system (VRS), all of which are known in the art. Remote facility 80 may include any or all of these various components and, preferably, each of the various components are coupled to one another via a wired or wireless local area network. Remote facility 80 may receive and transmit data via a modem connected to land network 76. A database at the remote facility can store account information such as subscriber authentication information, vehicle identifiers, profile records, behavioral patterns, and other pertinent subscriber information. Data transmissions may also be conducted by wireless systems, such as IEEE 802.11x, GPRS, and the like. Although the illustrated embodiment has been described as it would be used in conjunction with a manned remote facility 80 using a live advisor, it will be appreciated that the remote facility can instead utilize a VRS as an automated advisor or, a combination of the VRS and the live advisor can be used.

The personal mobile device 90 is a SRWC device and may include: hardware, software, and/or firmware enabling cellular telecommunications and SRWC as well as other mobile device applications. As used herein, a personal mobile device is a device that is capable of SRWC, that is portable by a user, and where the portability of the device is at least partly dependent on the user, such as a wearable device (e.g., a smartwatch), an implantable device, or a handheld device (e.g., a smartphone, a tablet, a laptop). As used herein, a short-range wireless communications (SRWC) device is a device capable of SRWC. The hardware of personal mobile device 90 may comprise: a processor and memory (e.g., non-transitory computer readable medium configured to operate with the processor) for storing the software, firmware, etc. The personal mobile devices' processor and memory may enable various software applications, which may be preinstalled or installed by the user (or manufacturer) (e.g., having a software application or graphical user interface or GUI). One implementation of a vehicle-mobile device application may enable a vehicle user to communicate with the vehicle 12 and/or control various aspects or functions of the vehicle, some of which are listed above. Another implementation may enable the user to make a reservation to use a vehicle that is a part of a car sharing service. Additionally, the application may also allow the user to connect with the remote facility 80 or call center advisors at any time. In other embodiments, there may be a plurality of personal mobile devices or SRWC devices 90. Such devices may communication with wireless communications device 30, NFC module 40, or each other according to one or more SRWC technologies or wired connections, such as a connection using Universal Serial Bus (USB) cable.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 20 are shown generally in FIG. 1 and includes a wireless communications device 30, an NFC module 40, a GPS module 22, engine control unit (ECU) 24, other VSMs 42, and numerous other components and devices. Some or all of the different vehicle electronics may be connected for communication with each other via one or more communication busses, such as bus 44. Communications bus 44 provides the vehicle electronics with network connections using one or more network protocols. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

The vehicle 12 can include numerous vehicle system modules (VSMs) as part of vehicle electronics 20, such as the GPS module 22, engine control unit (ECU) 24, wireless communications device 30, a near field communication (NFC) module 40, vehicle user interfaces 52-58, as will be described in detail below. The vehicle 12 can also include other VSMs 42 in the form of electronic hardware components that are located throughout the vehicle and, which may receive input from one or more sensors and use the sensed input to perform diagnostic, monitoring, control, reporting, and/or other functions. Each of the VSMs 42 is preferably connected by communications bus 44 to the other VSMs, as well as to the wireless communications device 30, and can be programmed to run vehicle system and subsystem diagnostic tests. One or more VSMs 42 may periodically or occasionally have their software or firmware updated and, in some embodiments, such vehicle updates may be over the air (OTA) updates that are received from a computer 78 or remote facility 80 via land network 76 and communications device 30. As is appreciated by those skilled in the art, the above-mentioned VSMs are only examples of some of the modules that may be used in vehicle 12, as numerous others are also possible.

Wireless communications device 30 is capable of communicating data via short-range wireless communications (SRWC). As shown in the exemplary embodiment of FIG. 1, wireless communications device 30 includes a wireless access point 32, a processor 34, memory 36, and one or more antennas 38 (only one is shown for illustrative purposes). In many embodiments, the wireless communications device 30 may be specifically configured to carry out the method disclosed herein. In one embodiment, wireless communications device 30 may be a standalone module or, in other embodiments, device 30 may be incorporated or included as a part of one or more other vehicle system modules, such as a center stack module (CSM), body control module, an infotainment module, a telematics module, a head unit, and/or a gateway module. In some embodiments, the device 30 can be implemented as an OEM-installed (embedded) or aftermarket device that is installed in the vehicle.

Wireless communications device 30 can be configured to communicate wirelessly according to one or more wireless protocols, including short-range wireless communications (SRWC) such as any of the IEEE 802.11 protocols, Wi-Fi™, WiMAX™, ZigBee™, Wi-Fi direct™, Bluetooth™, Bluetooth Low Energy™ (BLE), or near field communication (NFC). The short-range wireless communication chipset 32 enables the wireless communications device 30 to transmit and receive SRWC, such as BLE. The SRWC chipset may allow the device 30 to connect to another SRWC device. Additionally, in some embodiments, the wireless communications device may contain a cellular chipset thereby allowing the device to communicate via one or more cellular protocols, such as those used by cellular carrier system 70.

In one embodiment, the wireless communications device 30 may operate both when the vehicle is in a powered on state and when the vehicle is in a powered off state. As used herein, a "powered on state" is a state of the vehicle in which the ignition or primary propulsion system of the vehicle is powered on and, as used herein, a "powered off state" is a state of the vehicle in which the ignition or primary propulsion system of the vehicle is not powered on. The operation or state of the wireless communications device 30 may be controlled by another vehicle system module, such as by a BCM or by an infotainment module. In the powered on state, the wireless communications device 30 may always be kept "on" or supplied with power from a vehicle battery or other power source. In the powered off state, the wireless communications device 30 may be kept in a low-power mode or may be supplied power periodically so that device 30 may wake up and perform operations.

The vehicle may use the wireless communications device 30 to detect other SRWC devices, such as personal mobile devices 90. A connection between the wireless communications device 30 and one or more devices 90 may allow for the operation of various vehicle-device functionality. Vehicle-device functionality refers to any function of the vehicle that may be complimented, improved, supported, or carried out through a personal mobile device; any function of the personal mobile device that may be complimented, improved, supported, or carried out through the vehicle; or any other function that may be carried out using the vehicle and one or more personal mobile devices. For example, vehicle-device functionality can include using the personal mobile device to provide the vehicle with a contact list that may be displayed on visual display 58, audio/visual media content to be played via speakers 54 or display 58, navigational information (e.g., start and/or end locations), and/or vehicle commands or instructions that direct the vehicle to perform some operation. Other examples of vehicle-device functionality include using the vehicle electronics to provide the personal mobile device with hands-free calling, such as through use of vehicle-user interfaces to place, receive, and carry out voice calls; sending information to the personal mobile device, such as geographical information to the personal mobile device (such as information obtained from the GPS module 22) or vehicle diagnostic information or codes; and carrying out commands received at the vehicle from the personal mobile device.

Wireless communications device 30 may be set to a discovery mode when the vehicle desires to connect to a SRWC device, such as personal mobile device 90. As used herein, a discovery mode is an operating mode for a SRWC device in which the SRWC device attempts to discover or detect other SRWC devices using a SRWC protocol or technology. The discovery mode may include periodically sending out messages in an attempt to elicit a response from other SRWC devices in range.

Upon detection of a SRWC device (e.g., a personal mobile device) or receipt of a wireless message, the wireless communications device 30 may communicate with the SRWC device by transmitting and receiving one or more wireless messages. In one embodiment, a personal mobile device may be detected through receiving a NFC message at NFC module 40 (discussed more below). These wireless messages may include authenticating or otherwise verifying the identity of the SRWC device which sent (or ostensibly sent) the wireless message, authorizing the SRWC device using one or more authorization techniques (as discussed more below), and/or pairing the SRWC device and the wireless communications device 30 (e.g., such as through Bluetooth™ or Bluetooth Low Energy™ pairing). Additionally, upon detection of a SRWC device, the wireless communications device 30 may determine whether the wireless communications device 30 is bonded to the SRWC device. As used herein, "bonded" means that two devices (e.g., the wireless communications device 30 and personal mobile device 90) have previously been paired and each stores a common secret key, identifier, and/or other information that allows the devices to subsequently establish a new Bluetooth™ connection without pairing (i.e., exchanging security codes or keys). "Bluetooth™ bonded" refers to devices that are bonded using Bluetooth™ as the SRWC. As used herein, Bluetooth™ or Bluetooth™ technology refers to any of the Bluetooth™ technologies, such as Bluetooth Low Energy™ (BLE), Bluetooth™ 4.1, Bluetooth™ 4.2, Bluetooth™ 5.0, and other Bluetooth™ technologies that may be developed. As used herein, Wi-Fi™ or Wi-Fi™ technology refers to any of the Wi-Fi™ technologies, such as IEEE 802.11b/g/n/ac or any other IEEE 802.11 technology.

Once a connection is established between the wireless communications device 30 and the personal mobile device, such as mobile device 90, wireless messages may be sent between the vehicle and the personal mobile device. These wireless messages and/or the SRWC that sent these wireless messages may be authenticated and/or authorized by the vehicle. The authorization and/or authentication of the personal mobile device (or other SRWC device) may include verifying the identity of the personal mobile device and/or the user of the personal mobile device, as well as checking for authorization of the personal mobile device and/or the user of the personal mobile device. This verification may include comparing a key (e.g., a string or array of bits) included in the connection request (or subsequent message) with a key that the vehicle obtained from a remote facility 80.

The communications between the vehicle and the personal mobile devices may allow for functionality of the smartphone to be used by the vehicle electronics, or vice versa. For example, in the case where the personal mobile device is a cellular-enabled smartphone, received calls at the smartphone may be carried out through the audio system 54 and/or through use of microphone 56 of the vehicle electronics 20. This may be done so through the phone sending all received audio data or signals to the wireless communications device 30, which then may use bus 44 to send the audio signals to audio system 54. Likewise, video received at the smartphone 90 may be sent to the visual display 58 via the wireless communications device 30. Also, audio received at microphone 56 in the vehicle electronics may be sent to the smartphone 90 via wireless communications device 30.

Wireless communications device 30 may be in communication with one or more remote networks via packet-switched data communication. This packet-switched data communication may be carried out through use of a non-vehicle wireless access point that is connected to a land network via a router or modem. When used for packet-switched data communication such as TCP/IP, the communications device 30 can be configured with a static IP address or can be set up to automatically receive an assigned IP address from another device on the network such as a router or from a network address server.

Packet-switched data communications may also be carried out via use of a cellular network that may be accessible by the device 30 via, for example, a telematics unit included in the vehicle. In one embodiment, the communications device 30 may also include a cellular chipset or be communicatively coupled to a device comprising a cellular chipset such as a telematics unit. In either event, communications device 30 may, via a cellular chipset, communicate data over wireless carrier system 70. In such an embodiment, radio transmissions may be used to establish a communications channel, such as a voice channel and/or a data channel, with wireless carrier system 70 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art.

Processor 34 can be any type of device capable of processing electronic instructions including microprocessors, microcontrollers, host processors, controllers, vehicle communication processors, and application specific integrated circuits (ASICs). It can be a dedicated processor used only for communications device 30 or can be shared with other vehicle systems. Processor 34 executes various types of digitally-stored instructions, such as software or firmware programs stored in memory 36, which enable the device 30 to provide a wide variety of services. For instance, processor 34 can execute programs or process data to carry out at least a part of the method discussed herein. In one embodiment, device 30 includes an application that enables the method described below in FIG. 2. Memory 36 may include RAM, other temporary powered memory, any non-transitory computer-readable medium (e.g., EEPROM), or any other electronic computer medium that stores some or all of the software needed to carry out the various external device functions discussed herein.

Near field communication (NFC) module 40 includes an antenna (not shown) and is capable of receiving wireless messages using a NFC technology or protocol. The NFC module 40 may be connected to a vehicle bus or directly to one or more VSMs included in the vehicle electronics 20, such as wireless communications device 30. In some embodiments, NFC module 40 may be included in a vehicle cabin at an area that is accessible by a vehicle operator or passenger, such as near or within a center console, radio, or dashboard.

Wireless messages may be received by the NFC module 40 and, in one embodiment, the wireless messages may be in NFC Data Exchange Format (NDEF). In one embodiment, NFC module 40 may receive a connection handover request from a personal mobile device 90. As used herein, a connection handover is establishment of a SRWC connection where part of the establishment of the SRWC connection is done using a first SRWC protocol or technology (e.g., NFC) and where the SRWC connection is a connection using a SRWC protocol or technology. A NFC connection handover, is a connection handover where the first SRWC protocol or technology is NFC.

The connection handover may specify one or more SRWC technologies that are supported and/or enabled by the personal mobile device 90. In response to receiving the connection handover, the NFC module 40 may transmit a connection handover response (or select) message. This response or select message may indicate one or more SRWC technologies that are supported and/or enabled by the vehicle and, in some embodiments, may correspond to those SRWC technologies included in the connection handover request. Subsequently, the personal mobile device 90 and the wireless communications 30 may establish a SRWC connection using one or more of the SRWC technologies that were specified in the connection handover request or connection handover response. This SRWC connection is referred to herein as an alternate carrier connection. The information included in the NFC messages that provide information used to establish an alternate carrier connection are referred to herein as alternate carrier connection information and may include a Bluetooth™ address, a Wi-Fi™ service set identifier (SSID), and/or Wi-Fi™ passphrase or other security information. Any one or more of these messages may be in NDEF.

In some cases, when a wireless NFC message is received at the NFC module 40 from a personal mobile device 90, the vehicle may then determine whether the personal mobile device 90 supports NFC connection handovers and/or whether to perform a connection handover with the personal mobile device 90. When it is determined that the connection handover is to be performed and/or is supported by personal mobile device 90, the connection handover may be carried out. In some embodiments, the connection handover includes sending a NFC response message using the NFC module 40 in response to the wireless NFC message received from the personal mobile device 90 (such as a NFC connection handover response); subsequently, establishing an alternative carrier connection between the wireless communications device 30 and the personal mobile device 90 using a second SRWC technology (such as those specified in the NFC response message); and, after the alternative carrier connection is established between the wireless communications device and the personal mobile device using a second SRWC technology, then carrying out SRWC communications using the established alternative carrier connection.

When is determined that the connection handover is to be performed and/or is supported by personal mobile device 90, the connection handover may not be carried out. Instead, the vehicle may set or configure wireless communications device 30 to operate in a discovery mode, as discussed above.

In some embodiments, wireless messages may be received from NFC tags that come into a close proximity of the NFC module (e.g., 20 centimeters). In such a case, the wireless message may be an NDEF record stored on an NFC tag that is read by the NFC module 40. In one embodiment, the NFC module 40 may read information from an initiator (i.e., a device or article that generates a radio frequency (RF) field), such as an NFC tag or NFC transmitter. For example, NFC module 40 may read information stored on an NFC tag that is attached to a personal mobile device 90. The information may include alternative carrier connection information, such as a Bluetooth™ address (BT_ADDR). The NFC module 40 may also operate in an NFC peer-to-peer configuration, wherein communications are carried out between the NFC module 40 (in the peer-to-peer configuration) and another NFC-enable device, such as a smartphone 90, which will be described in more detail below. In other embodiments, the NFC module 40 may also include a processor, chipset, and/or multiple antennas.

In other embodiments, a different SRWC device or wireless communications device 30 may be used in place of the NFC module 40, such as a device that is capable of transmitting and/or receiving short-range wireless communications, such as any of the IEEE 802.11 protocols, Wi-Fi™, WiMAX™, ZigBee™, Wi-Fi direct™, Bluetooth™ and/or Bluetooth Low Energy™ (BLE). The NFC module (or other SRWC device) may be connected to wireless communications device 30 and/or bus 44. As will be discussed more below, the NFC module 40 may receive wireless messages and then forward these messages to wireless communications device 30 or another VSM.

Global position system (GPS) module 22 receives radio signals from a constellation of GPS satellites (not shown). From these signals, the module 22 can determine vehicle position which may enable the vehicle to determine whether it is at a known location, such as home or workplace. Moreover, GPS module 22 can provide this location data to wireless communications device 30, which can then use this data to identify known locations, such as a vehicle operator's home or workplace. Additionally, GPS module 22 may be used to provide navigation and other position-related services to the vehicle operator. Navigation information can be presented on the display 58 (or other display within the vehicle) or can be presented verbally such as is done when supplying turn-by-turn navigation. The navigation services can be provided using a dedicated in-vehicle navigation module (which can be part of GPS module 22), or some or all navigation services can be done via a telematics unit installed in the vehicle, wherein the position information is sent to a remote location for purposes of providing the vehicle with navigation maps, map annotations (points of interest, restaurants, etc.), route calculations, and the like. The position information can be supplied to remote facility 80 or other remote computer system, such as computer 78, for other purposes, such as fleet management and/or for use in a car sharing service. Also, new or updated map data can be downloaded to the GPS module 22 from the remote facility 80 via a vehicle telematics unit.

Vehicle electronics 20 also includes a number of vehicle user interfaces that provide vehicle occupants with a means of providing and/or receiving information, including pushbutton(s) 52, audio system 54, microphone 56, and visual display 58. As used herein, the term "vehicle user interface" broadly includes any suitable form of electronic device, including both hardware and software components, which is located on the vehicle and enables a vehicle user to communicate with or through a component of the vehicle. The pushbutton(s) 52 allow manual user input into the communications device 30 to provide other data, response, or control input. Audio system 54 provides audio output to a vehicle occupant and can be a dedicated, stand-alone system or part of the primary vehicle audio system. According to the particular embodiment shown here, audio system 54 is operatively coupled to both vehicle bus 44 and an entertainment bus (not shown) and can provide AM, FM and satellite radio, CD, DVD and other multimedia functionality. This functionality can be provided in conjunction with or independent of an infotainment module. Microphone 56 provides audio input to the wireless communications device 30 to enable the driver or other occupant to provide voice commands and/or carry out hands-free calling via the wireless carrier system 70. For this purpose, it can be connected to an on-board automated voice processing unit utilizing human-machine interface (HMI) technology known in the art. Visual display or touch screen 58 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Figure 2:
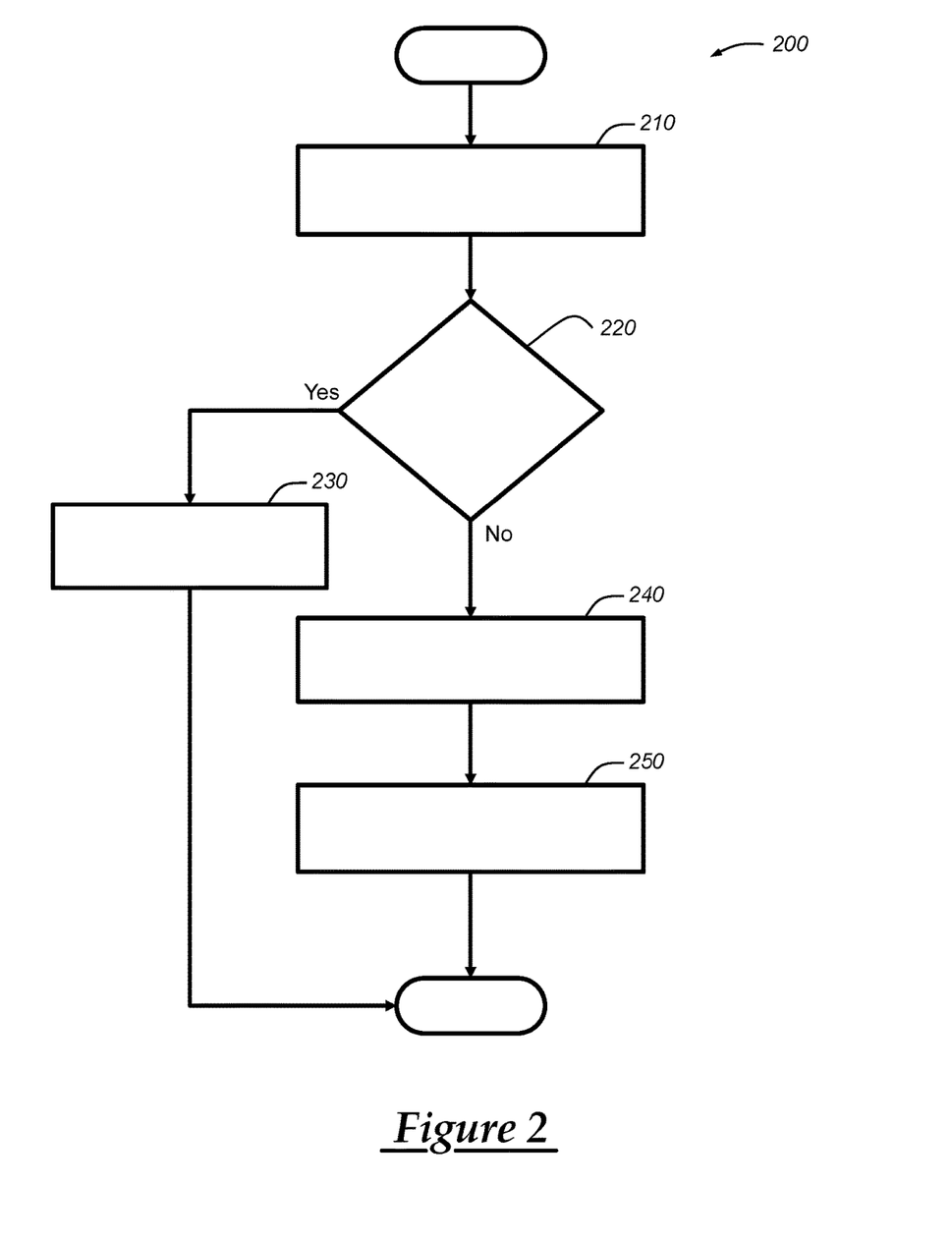
FIG. 2 is a flowchart illustrating a managing short-range wireless communication connections at a vehicle.

With reference to FIG. 2, there is shown an embodiments of a method 200 of managing short-range wireless communication connections at a vehicle. Method 200 begins with step 210, wherein a wireless message is received from a personal mobile device at a vehicle. The wireless signal may be received using a first short-range wireless communication (SRWC) protocol or technology, such as near field communications (NFC). In one embodiment, the wireless signal may be wireless NFC message received from a personal mobile device via near field communication (NFC) technology at a NFC module installed in the vehicle. The wireless NFC message may be in NFC Data Exchange Format (NDEF) and may have been sent from a NFC chipset installed in personal mobile device 90. In one embodiment, the wireless NFC message may be a connection handover request that includes information specifying one or more SRWC technologies or protocols that the personal mobile device 90 supports, that device 90 currently has enabled, or that device 90 desires to connect over. For example, the one or more SRWC technologies or protocols may include a Bluetooth™ technology or a Wi-Fi™ technology. In one embodiment, the wireless message may include Bluetooth™ Out-of-Band (OOB) data or other information that may be used to establish an alternative carrier connection or a SRWC connection using NFC messages.

Once the wireless message is received, the wireless message may be stored and/or sent to another VSM. For example, in an embodiment where the wireless message is received at the NFC module 40, the NFC module 40 may send the wireless message (or information derived therefrom) to wireless communications device 30, which may then store the message in memory 36. The method 200 proceeds to step 220.

In step 220, it is determined whether the personal mobile device should perform a connection handover based on the received wireless signal. In one embodiment, the received wireless message may be parsed by a processor, such as processor 34 in wireless communications device 30. The vehicle may determine whether the personal mobile device 90 supports a connection handover based on information contained in the received wireless signal. In one example, the received wireless signal may specify certain SRWC technologies which the personal mobile device 90 supports and the vehicle may determine that none of those SRWC technologies which the personal mobile device 90 supports are supported by the vehicle and, thus, the personal mobile device should not perform the connection handover. The determination may be made by the wireless communications device and/or the NFC module.

The NFC module may send information included in or associated with the received wireless message from the personal mobile device to the wireless communications device 30, which then may use this information to make a determination of whether the personal mobile device should perform a connection handover. For example, this determination may depend on the format or the type of information included in the wireless message. In one embodiment, the message may include an indicator that indicates that it supports connection handovers using NFC.

In another embodiment, it is determined whether the personal mobile device supports a connection handover based on the received message. For example, the determination of whether to perform the connection handover can be based on whether the personal mobile device supports connection handovers using NFC. The method 200 then continues to step 230 if a connection handover is to be performed or is supported; otherwise the method 200 continues to step 240.

In step 230, the connection handover is carried out. In some embodiments, the connection handover may include sending a NFC response message using the NFC module installed in the vehicle in response to the wireless NFC message received from the personal mobile device; subsequently, establishing an alternative carrier connection between a wireless communications device and the personal mobile device using a second SRWC technology; and carrying out SRWC communications using the established alternative carrier connection. For example, a Bluetooth™ connection between the wireless communications device 30 and personal mobile device 90 may be established. The wireless communications device 30 and personal mobile device 90 may each include a Bluetooth™ chipset in such a case.

In some embodiments, the NFC response message sent using the NFC module may be a connection handover response and may specify or indicate at least one short-range wireless communication (SRWC) technology other than NFC that the vehicle is configured to carry out. This NFC response message may be in NDEF and may be generated in response to the received wireless message. For example, the personal mobile device 90 may only have one enabled SRWC technology other than NFC, such as Wi-Fi™. The vehicle may support multiple SRWC technologies other than NFC, such as Bluetooth™ and Wi-Fi™, but may only indicate or specify Wi-Fi™ in the NFC response message since the received wireless message from personal device 90 only indicated Wi-Fi™. Once a response message is sent, the personal mobile device 90 and the wireless communications device 30 may establish an alternate carrier connection using a second SRWC technology, such as Wi-Fi™ or Bluetooth™. After the alternative carrier connection is established between the wireless communications device 30 and the personal mobile device 90, then SRWC communications using the established alternative carrier connection may be carried out. Such communications may be used to carry out vehicle-device functionality, such as providing media content from the personal mobile device 90 to the vehicle to be played using audio system 54 or visual display 58.

In one embodiment, information included in the received wireless message or a subsequent response message may be used to establish a connection. For example, the received wireless message (or a subsequent message sent from the device 90 to the vehicle using the first SRWC) may indicate a Bluetooth™ address (BT_ADDR) and, thus, this information may provide for an expedited establishment of a Bluetooth™ connection between personal mobile device 90 and wireless communications device 30. The method 200 then ends.

In step 240, the wireless communications device is set to operate in a discovery mode. In some embodiments, the discovery mode includes sending an inquiry message indicating availability of a connection to the wireless communications device. This inquiry message may be sent using a second SRWC and may indicate that the wireless communications device 30 is ready to connect using the second SRWC or other SRWC. This message may be generated by processor 34 and may be sent by wireless access point 32 using antenna 38.

In some embodiments, a user may be notified that the personal mobile device is not enabled to perform a connection handover or that a connected handover will not be performed. For example, the vehicle may use vehicle-user interfaces, such as audio system 54 and/or visual display 58 to inform or display a message indicating the connection handover will not be performed or that the personal mobile device is not capable of performing the connection handover. This notification may be carried out during, before, or after step 240. The method 200 then proceeds to step 250.

In step 250, a SRWC connection is established between the wireless communications device 30 and the personal mobile device 90 using a SRWC technology. For example, the personal mobile device 90 may realize that the wireless communications device 30 is ready to connect or desires to connect to device 90 based on the inquiry message sent by the wireless communications device 30 and received by the personal mobile device 90. Then, the mobile device 90 may send a response message to the wireless communications device 30. Thereafter, the device 90 and the wireless communications device 30 may carry out subsequent communications to establish a SRWC connection using a second SRWC technology, such as Bluetooth™ or Wi-Fi™ The subsequent communications may be a four-way handshake and may include the exchanging of personal and/or private keys. Moreover, these messages (and any of the wireless messages discussed herein) may be encrypted using one or more private or public keys.

After the SRWC connection is established between the wireless communications device 30 and the personal mobile device 90, then SRWC communications using the established SRWC connection may be carried out. Such communications may be used to carry out vehicle-device functionality, such as providing media content from the personal mobile device 90 to the vehicle to be played using audio system 54 or visual display 58. The method 200 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive or. As an example, the phrase "A, B, and/or C" includes: "A"; "B"; "C"; "A and B"; "A and C"; "B and C"; and "A, B, and C."

The invention claimed is:

1. A method of managing short-range wireless communication connections at a vehicle, the method comprising:
receiving a wireless signal from a personal mobile device at the vehicle, wherein the wireless signal is received using a first short-range wireless communication (SRWC) technology, and wherein the first SRWC technology is a near field communication (NFC) technology;
in response to receiving the wireless signal from the personal mobile device at the vehicle, determining whether to perform a connection handover based on the received wireless signal, wherein the determination of whether to perform the connection handover is based on a determination of whether the personal mobile device supports connection handovers using NFC, and wherein the determination of whether the personal mobile device supports connection handovers using NFC is made based on information contained in the received wireless signal;
when it is determined that the connection handover is to be performed, then carrying out the connection handover that includes establishing an alternative carrier connection between a wireless communications device and the personal mobile device using a second SRWC technology, wherein the wireless communications device is installed in the vehicle, and wherein the second SRWC technology is one of the following: Wi-Fi™, WiMAX™, ZigBee™, Wi-Fi direct™, Bluetooth™, or Bluetooth Low Energy™ (BLE); and
when it is determined that the connection handover is not to be performed, then:
notifying a vehicle user that the personal mobile device is not enabled to perform the connection handover or that a connection handover will not be performed, wherein the notifying step includes transmitting a notification using at least one vehicle-user interface of the vehicle, and wherein the at least one vehicle-user interface of the vehicle includes either or both of an audio system or a display; and
setting the wireless communications device to operate in a discovery mode, wherein the discovery mode includes using the second SRWC technology of the wireless communications device to send an inquiry message, wherein the inquiry message indicates that the wireless communications device is available to connect to another device.

2. The method of claim 1, wherein the wireless signal is a wireless near field communication (NFC) signal that is in NFC Data Exchange Format (NDEF).

3. The method of claim 2, wherein the NFC module is connected to the wireless communications device, and wherein the NFC module sends information included in or associated with the received wireless signal.

4. The method of claim 1, wherein the wireless signal is received at a NFC module installed in the vehicle.

5. The method of claim 1, wherein the connection handover further comprises sending a response message to the personal mobile device from the NFC module.

6. The method of claim 1, further comprising the step of establishing a SRWC connection using the second SRWC protocol after setting the wireless communications device to the discovery mode.

7. The method of claim 6, wherein the second SRWC technology is a Bluetooth™ or Wi-Fi™ technology.

8. The method of claim 1, wherein the wireless message includes Bluetooth™ Out-of-Band (OOB) data.

9. The method of claim 1, wherein the wireless communications device comprises a first SRWC chipset that is used to carry out wireless communications via the first SRWC technology and wherein the wireless communications device comprises a second SRWC chipset that is used to carry out wireless communications via the second SRWC technology.

10. A method of managing short-range wireless communication connections at a vehicle, the method comprising:
receiving a wireless NFC message from a personal mobile device via near field communication (NFC) technology at a NFC module installed in the vehicle, wherein the wireless NFC message is in NFC Data Exchange Format (NDEF), and wherein the personal mobile device includes an NFC chipset;
in response to receiving the wireless NFC message from the personal mobile device at the vehicle, determining whether to perform a connection handover based on the received wireless NFC message, wherein the determination of whether to perform the connection handover is based on a determination of whether the personal mobile device supports connection handovers using NFC, and wherein the determination of whether the personal mobile device supports connection handovers using NFC is made based on information contained in the received wireless NFC message;
when it is determined that the connection handover is to be performed, then automatically carrying out the connection handover, wherein the connection handover includes:
sending a NFC response message to the personal mobile device using the NFC module installed in the vehicle in response to the wireless NFC message received from the personal mobile device, wherein the NFC response message is in NFC Data Exchange Format (NDEF), and wherein the NFC response message indicates at least one short-range wireless communication (SRWC) technology other than NFC that the vehicle is configured to carry out;
subsequently, establishing an alternative carrier connection between a wireless communications device and the personal mobile device using a second SRWC technology, wherein the wireless communications device is included in the vehicle, wherein the second SRWC technology is one of the at least one SRWC technologies indicated in the NFC response message, and wherein the second SRWC technology is one of the following: Wi-Fi™, WiMAX™, ZigBee™, Wi-Fi direct™, Bluetooth™, or Bluetooth Low Energy™ (BLE); and
after the alternative carrier connection is established between the wireless communications device and the personal mobile device using a second SRWC technology, then carrying out SRWC communications using the established alternative carrier connection; and
when it is determined that the connection handover should is not to be performed, then:
notifying a vehicle user that the personal mobile device is not enabled to perform the connection handover or that a connection handover will not be performed, wherein the notifying step includes transmitting a notification using at least one vehicle-user interface of the vehicle, and wherein the at least one vehicle-user interface of the vehicle includes either or both of an audio system or a display; and setting the wireless communications device to operate in a discovery mode using one or more SRWC technologies including Bluetooth™, wherein the discovery mode includes using the second SRWC technology of the wireless communications device to send an inquiry message, wherein the inquiry message indicates that the wireless communications device is available to connect to another device.

11. A vehicle communications system, comprising:
a near field communications (NFC) module that includes a NFC chipset and an antenna;
at least one vehicle-user interface; and
a wireless communications device, comprising:
   a short-range wireless communications (SRWC) chipset;
   a memory device;
   a processor;
wherein the vehicle communications system is configured to:
   receive a NFC signal from a personal mobile device at the NFC module, wherein the NFC signal is in NFC Data Exchange Format (NDEF);
   in response to receiving the NFC signal from the personal mobile device at the vehicle, determine whether to perform a connection handover based on the received NFC signal, wherein the determination of whether to perform the connection handover is based on a determination of whether the personal mobile device supports connection handovers using NFC, and wherein the determination of whether the personal mobile device supports connection handovers using NFC is made based on information contained in the received NFC signal;
   when it is determined that the connection handover is to be performed, then carry out the connection handover that includes establishing an alternative carrier connection between a wireless communications device and the personal mobile device using a second SRWC technology, wherein the wireless communications device is installed in the vehicle, and wherein the second SRWC technology is one of the following: Wi-Fi™, WiMAX™, ZigBee™, Wi-Fi direct™, Bluetooth™, or Bluetooth Low Energy™ (BLE); and
   when it is determined that the connection handover is not to be performed, then:
     notify a vehicle user that the personal mobile device is not enabled to perform the connection handover or that a connection handover will not be performed, wherein the notifying step includes transmitting a notification using the at least one vehicle-user interface, and wherein the at least one vehicle-user interface includes either or both of an audio system or a display; and
   set the wireless communications device to operate in a discovery mode, wherein the discovery mode includes using the second SRWC technology of the wireless communications device to send an inquiry message, wherein the inquiry message indicates that the wireless communications device is available to connect to another device.

12. The vehicle communications system of claim 11, wherein the vehicle communications system is configured to perform the determining step using the processor of the wireless communications device.

13. The vehicle communications system of claim 12, wherein the vehicle communications system is further configured to send information included in or associated with the NFC signal from the NFC module to the wireless communications device and, wherein the determination of whether to perform the connection handover is based on the information sent from the NFC module.

\* \* \* \* \*